United States Patent [19]
Salsman

[11] Patent Number: 5,820,982
[45] Date of Patent: Oct. 13, 1998

[54] SULFOARYL MODIFIED WATER-SOLUBLE OR WATER-DISPERSIBLE RESINS FROM POLYETHYLENE TEREPHTHALATE OR TEREPHTHALATES

[75] Inventor: Robert Keith Salsman, Hoschton, Ga.

[73] Assignee: Seydel Companies, Inc., Atlanta, Ga.

[21] Appl. No.: 753,954

[22] Filed: Dec. 3, 1996

[51] Int. Cl.$^6$ ....................................................... D02G 3/00
[52] U.S. Cl. ........................... 428/364; 428/365; 428/480; 524/174; 524/177; 524/601; 524/603; 528/272; 528/274; 528/279
[58] Field of Search ..................................... 428/364, 480; 528/272, 274, 279, 283, 285, 295, 300, 301, 302, 308, 308.6; 524/174, 177, 601, 603, 604, 605, 608, 609, 700, 783

[56] References Cited

U.S. PATENT DOCUMENTS 5,290,631  3/1994  Fleury et al. ............................ 428/364

*Primary Examiner*—Terressa Mosley
*Attorney, Agent, or Firm*—Cort Flint

[57] ABSTRACT

Water-soluble or water-dispersible and curable polyester resins are suitable as binders in various applications. The resins are reaction products of polyterephthalate, sulfoisophthalates, polyols, polyacids, end acids and crosslinker agents. Waste terephthalates can be utilized. The preferred polyol is pentaerythritol. The resins can also be used as dye levelling agents when dyeing synthetic fibers.

31 Claims, No Drawings

SULFOARYL MODIFIED WATER-SOLUBLE OR WATER-DISPERSIBLE RESINS FROM POLYETHYLENE TEREPHTHALATE OR TEREPHTHALATES

This invention relates to water-soluble or water-dispersible polyester resins. The invention permits utilization of plastic materials which would otherwise be discarded in landfills or other solid waste deposit facilities.

The polyester resins can be used as textile sizing compositions.

BACKGROUND OF THE INVENTION

Dale et al., in U.S. Pat. No. 4,104,222, have proposed making a dispersion of linear polyester resins by mixing linear polyester resin with a higher alcohol/ethylene oxide addition-type surface-active agent, melting the mixture and dispersing the resulting melt in an aqueous alkali solution. The products are used as coating and impregnating agents.

Altenberg, in U.S. Pat. No. 4,604,410, has proposed making etherified aromatic polyols by digesting scrap polyalkylene terephthalate with a low molecular weight polyhydroxy compound, containing 3–8 hydroxyl groups. A resulting intermediate is alkoxylated with 1–4 moles of ethylene oxide and/or propylene oxide. The final product is useful in making polyurethane and polyisocyanurate foams.

Sperenza et al. (U.S. Pat. No. 4,485,196) have recited reacting recycled polyethylene terephthalate scrap with an alkylene oxide, such as propylene oxide. The product can be used in making rigid foams.

Other methods of reacting scrap polyalkylene terephthalate with glycols or polyols are proposed by Svoboda et al. (U.S. Pat. No. 4,048,104) and Altenberg et al. (U.S. Pat. No. 4,701,477).

In our previous invention (U.S. Pat. No. 4,977,191 (Salsman)) we disclosed a water-soluble or water-dispersible polyester resin suitable for textile sizing applications. The polyester resin comprises a reaction product of 20–50% by weight of waste terephthalate polymer, 10–40% by weight of at least one glycol and 5–25% by weight of at least one oxyalkylated polyol. Preferred compositions also comprise 20–50% by weight of isophthalic acid. A further water-soluble or water-dispersible resin comprises a reaction product of 20–50% by weight of waste terephthalate polymer, 10–50% by weight of at least one glycol and 20–50% by weight of isophthalic acid.

U.S. Pat. No. 5,252,615 (Rao et al.) discloses coating compositions derived from alcoholysis of polyethylene terephthalate (PET). Most preferably, the PET is recycled or reclaimed from plastic articles.

References proposing the use of copolymers containing terephthalic units and units derived from alkylene and polyoxyalkylene glycols for fiber or fabric treatment include ayes (U.S. Pat. No. 3,939,230), Nicol et al. (U.S. Pat. No. 3,962,152), Wada et al. (U.S. Pat. No. 4,027,346), Nicol (U.S. Pat. No. 4,125,370) and Bauer (U.S. Pat. No. 4,370,143).

Marshall et al., in U.S. Pat. No. 3,814,627, have proposed applying an ester, based on polyethylene glycol, to polyester yarn.

In our patent U.S. Pat. No. 5,281,630 (Salsman) we disclose sulfonated water-soluble or water-dispersible polyester resin compositions made by treating a polyester glycolysis product with an alpha, beta-ethylenically unsaturated dicarboxylic acid and then with a sulfite.

OBJECTS OF THE INVENTION

It is an object of the invention to produce water-soluble or water-dispersible polyester resin compositions.

It is another object of the invention to utilize waste material in the production of polyester resins.

It is still another object of the invention to use the water-soluble or water-dispersible coatings for fiber, paper or fabric.

Another object of the present invention is to provide recycled sulfoarylated resins derived from waste PET useful as a dye leveling aid.

SUMMARY OF THE INVENTION

The present invention relates to novel water-soluble or water-dispersible polyester resins and a method for making resins.

In one aspect, this invention relates to a water-soluble or water-dispersible polyester resin, comprising a reaction product of 1–50% by weight of sulfoaryl dicarboxylic acid, 10–50% by weight of waste terephthalate polymer, 10–50% by weight of at least one glycol and optionally 1–50% by weight of at least one oxyalkylated polyol.

In another aspect, this invention relates to a water-soluble or water-dispersible polyester resin, comprising a reaction product of 1–50% by weight of ester of sulfoaryl dicarboxylic acid and alcohol, 10–50% by weight of waste terephthalate polymer, 10–50% by weight of at least one glycol and optionally 1–50% by weight of at least one oxyalkylated polyol. Preferred resins also comprise 15–50% by weight of polyacid.

And still in another aspect, this invention relates to a water-soluble or water-dispersible polyester resin, comprising a reaction product of 15–50% of ester of sulfoaryl dicarboxylic acid and polyalkyleneglycol, 10–50% by weight of waste terephthalate polymer, 10–50% by weight of at least one glycol, optionally 15–50% by weight of at least one oxyalkylated polyol, and 15–50% by weight of polyacid.

The polyacid is preferably selected from the group consisting of isophthalic acid, terephthalic acid, phthalic anhydride (acid), adipic acid and etc. The most preferred polyacids but not limited to are phthalic anhydride (acid), isophthalic and terephthalic acids.

The invention further relates to water-soluble or water-dispersible resins, as above, dissolved or dispersed in water with an alkali metal or ammonium hydroxide or carbonate.

The instant invention also provides the use of the above resins in dye leveling in the process of dyeing fibers such as polyesters and nylon fibers.

DETAILED DESCRIPTION OF THE INVENTION

The objects of the present invention and many of expected advantages of the present invention will be readily appreciated as the same becomes better understood by the reference to the following detailed description.

The water-soluble or water-dispersible resins are made from waste terephthalate polymers, including bottles, sheet material, textile wastes and the like. The waste terephthalate plastics may be bought from recyclers and include, but are not limited to, material identified as "PET rock". The waste terephthalate can be characterized by the unit formula

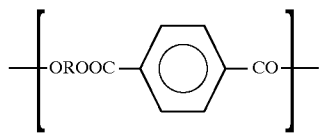

(1)

wherein R is the residue of an aliphatic or cycloaliphatic glycol of 2–10 carbons of or oxygenated glycol of the formula

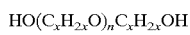

(2)

wherein x is an integer from 2–4 and n is 1–10.

Preferably the waste terephthalate polymer is a polyalkylene terephthalates such as polyethylene terephthalate and polybutylene terephthalate, polycyclohexanedimethanol terephthalate or a mixture thereof.

It will be understood that, for reasons of economy, the use of waste terephthalates is preferred. However, the use of virgin terephthalate resins is to be included within the scope of the disclosure and appended claims.

The polyacid is preferably selected from the group consisting of isophthalic acid, terephthalic acid, phthalic anhydride (acid), adipic acid and etc. The most preferred polyacids but not limited to are phthalic anhydride (acid), isophthalic and terephthalic acids.

The glycol with which the waste terephthalate polymer is reacted can be selected from a variety of known dihydric alcohols. Preferred glycols include, but are not limited to, ethylene glycol, diethylene glycol, triethylene glycol, cyclohexanedimethanol, propylene glycol, butylene glycol, neopentyl glycol, 1,5-pentanediol, 1,6-hexanediol or mixtures thereof.

Most preferably, the glycol is a mixture of diethylene glycol and neopentyl glycol.

The oxyalkylated polyol is derived from any polyol, having three or more alcohol functions. Polyols include glycerol, trimethylolpropane, trimethylolethane, pentaerythritol, erythritol, sorbitol, mannitol, other sugar alcohols or monosaccharides. The polyols are oxyalkylated with an alkylene oxide, including, but not limited to ethylene oxide, propylene oxide, butylene oxide, amylene oxide, etc.

Preferably, the oxyalkylated polyol is glycerol, trimethylolpropane, trimethylolethane, pentaerythritol, erythritol or a monosaccharide, oxyalkylated with 5–30 moles of ethylene oxide, propylene oxide or a mixture thereof, per hydroxyl of the polyol. Polyols are chosen as above.

The polyester resins can be made by heating sulfoarylcarboxylic acid, esters of sulfoarylcarboxylic acid, waste or virgin terephthalate polymer, glycol, oxyalkylated polyol and polyacid together in any order until breakdown and reconstruction of a mixed terephthalate-polyacid ester has occurred.

The sulfoarylcarboxylates are esters of sulfoarylcarboxylic acids and alcohols, polyols or oxyalkylated polyols.

The methyl sulfoaryl dicarboxylates employed in the process of the invention are compounds having at least one sulfonic acid group, typically on the form of alkali metal sulfonate and two carboxylic acid functions bonded to an aromatic ring. Particularly exemplary such compounds have the formula (3):

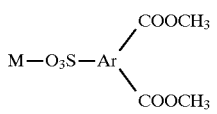

(3)

in which M is a hydrogen atom or, preferably, a sodium, potassium or lithium atom, and Ar is an aryl radical selected from the group consisting of a phenyl, substituted phenyl, naphthyl and substituted naphthyl radicals.

Specific examples of such compounds of formula (3) include dialkyl esters of sulfoaryl dicarboxylic acids such as sulfoisophthalic acids, sulfophalic acids, sulfoterephthalic acids and sulfonaphthalene dicarboxylate. The most preferred is dimethyl sodium-5-sulfo-isophthalate.

Esters of sulfoaryl dicarboxylic acids and polyglycols can be used instead of sulfoaryl dicarboxylates. The most preferred is the ester of sulfoisophthalic acid and polyethylene glycol wherein glycol units are represented by recurring ethylene radicals separated by oxygen atoms.

In making the water-soluble or water-dispersible polyesters, it is preferred to heat sulfoaryl dicarboxylic acid or its esters, the waste terephthalate polymer, glycol and oxyalkylated polyol above about 150° C. to partially breakdown the terephtalate and then to heat the thus-produced intermediate with polyacid under similar temperature conditions.

A most preferred product is that obtained by heating dimethyl sulfoisophthalates, waste terephthalate polymer, glycol and oxyalkylated polyol above about 150° C. to produce an intermediate product, characterized by a 15-minute clear peel, and heating the thus-obtained intermediate product with polyacid at a temperature of at least 150° C.

Polyester resins, containing trimellitic acid or trimellitic anhydride, are preferably made by heating an polyacid-containing intermediate with trimellitic acid or trimellitic anhydride.

The interexchange reaction is carried out at a temperature adapted to remove formed methanol from a reactor by distillation.

The esterification stage is then conducted by adding polyacid and ethylene glycol to the reaction medium. The direct esterification process is carried out in the presence of the same catalyst as used in the interexchange stage.

When water and ethylene glycol are eliminated from a reaction mixture, the polycondensation reaction is carried out.

Preferred terephthalate feeds are as above. Most preferred feeds are polyethylene terephthalate or poly (cyclohexanedimethanol terephthalate).

Glycols are as recited above or a mixture of diethylene glycol and cycloxehanedimethanol.

A preferred product is that comprising a reaction product of 1–50% by weight of sulfoaryl dicarboxylic acid, 10–50% by weight of waste terephthalate polymer, and 10–50% by weight of at least one glycol. The resins may optionally incorporate 1–50% by weight of at least one oxyalkylated polyol.

Another preferred product is a water-soluble or water-dispersible polyester resin, comprising a reaction product of 1–10% by weight of sulfoaryl dicarboxylate, 10–50% by weight of waste terephthalate polymer, 10–50% by weight of at least one glycol and optionally 15–50% by weight of at least one oxyalkylated polyol. Preferred resins also comprise 15–50% by weight of polyacid.

Similar preferred product is a water-soluble or water-dispersible polyester resin, comprising a reaction product of 15–50% of ester of sulfoaryl dicarboxylic acid and polyalkeleneglycol, 10–50% by weight of waste terephthalate polymer, 10–50% by weight of at least one glycol, optionally 15–50% by weight of at least one oxyalkylated polyol, and 15–50% by weight of polyacid.

A highly preferred product is that comprising a reaction product of 1–10% by weight of dimethylsulfoisophthalate, 10–50% by weight of polyethylene terephthalate, 1–25% by weight of diethylene glycol, 1–15% by weight of neopentyl glycol, 1–10 by weight of pentaerythritol, 5–15% by weight of at least one oxyalkylated glycerine having 5–30 oxyethylene units per hydroxyl, 15–50 by weight of phthalic anhydride, and 5–10% by weight of trimellitic acid or trimellitic anhydride.

Another highly-preferred water-soluble or water-dispersible polyester resin comprises a reaction product of 15–35% by weight of the ester of sulfoisophthalic acid and polyethylene glycol, 15–25% by weight of polyethylene terephthalate, 1–10% by weight of oxyethylated glycerine having 5–30 oxyethylene units per hydroxyl, 35–50% by weight of oxyalkyl units per hydroxyl, 35–50% by weight of phthalic anhydride.

Addition of 0.05–1% by weight of hypophosphoric acid greatly improves the color of the product that is generated from the recycled PET.

The polyester resins are usually and preferably made using an ester-interchange catalyst. These catalysts are metal carboxylates and well known organometallic compounds, particularly compounds of tin or titanium. Preferred catalysts include manganese acetate, sodium acetate, zinc acetate, cobalt acetate or calcium acetate, tetraalkyl titanates, in which the alkyl is of up to 8 carbon atoms, as well as alkyl stannoic acid or dialkyl tin oxides, such as monobutyl stannoic acid or dialkyl tin oxide. Preferred catalysts include monobutyl stannoic acid and tetrapropyl or tetrabutyl titanate, or a mixture thereof.

The resinous products obtained are generally taken up in relatively concentrated aqueous solutions of alkali metal or ammonium hydroxides or carbonates. The concentration employed can be determined by routine experimentation. However, if shipping of the concentrated aqueous solutions to a point of use is contemplated, it is preferred to produce highly concentrated solutions. It is within the scope of this invention to produce initial solutions or dispersions, containing 20–30% or more of resin solids.

The compositions of this invention are used as sizing materials for fibers, fabrics or paper. In the textile industry, yarns are often sized before incorporation into woven or unwoven fabrics. Sizing consists of depositing a desired amount of sizing material onto the yarn. Sizing increases the tensile strength of yarns and, in some cases, reduces yarn-to-metal coefficient of friction. Strengthening yarn is desirable in order to minimize breakage in subsequent operations, such as weaving. A low yarn-to-metal coefficient of friction decreases yarn and machine wear.

Sizing materials can also be applied to fabrics. These fabrics are known as loom finished goods. The treated fabrics, after removal from the loom, before any further washing steps, have a hand which is influenced by the characteristics of the fiber, of the fabric and by the type and amount of sizing of the fabric. The products of this invention are useable when a water-soluble sizing is acceptable.

Sizing compositions are normally applied to paper in a size press. The paper sheet is semi-dried and is run using conventional equipment through the a sizing solution at high speed. The paper is then run through press rolls under a high nip pressure and the treated sheet is dried under a dryer. Surface sizing is often considered superior to internal sizing because most of the sizing solution is retained on the paper.

In any of the foregoing applications for the products of this invention, the resins are either taken up in a solution of an alkali metal or ammonium carbonate or hydroxide to the desired concentration or a relatively concentrated solution or dispersion in aqueous alkali metal or ammonium hydroxide or carbonate is diluted with water to the desired concentration. The concentration of material to be applied to fiber, fabric or paper can readily be determined by routine experimentation. However, preferably, the solution or dispersion of water-soluble or water-dispersible resin being applied contains 0.5–5% of resin solids.

The resins of the present invention are particularly useful as dye-leveling aids. Dye leveling is used to impart an even cast to a textile or carpet, prevent streaks, and to transfer dye to hard to reach areas such as fold or creases the fabric is subjected to during the dyeing process. The resins are particularly useful as dye levelers in dyeing polyester and nylon fibers.

Applicant's have also found that even dyeings can be obtained on all sorts of synthetic fibers, under unfavourable dyeing conditions as well as with the use of dyeing goods yielding unlevel dyeings, with water-insoluble disperse dyes according to the exhaustion method, when beside the dye stuff and the substances adjusting the pH, there is present the water dispersible or soluble polyester resins of the present invention derived from waste PET or virgin PET.

The present invention also describes a process for the level dyeing of synthetic fibers derived from polyesters and polyamides, with water insoluble disperse dyestuffs, which comprises adding to the aqueous dystuff and pH regulating substances, as levelling agents an effective amount of the recycled resins of the present invention so as to impart level dyeing to said fibers.

BEST MODE FOR CARRYING OUT THE INVENTION

A preferred product is one comprising a reaction product of 3–10% by weight of dimethylsulfoisophthalate, 10–35% by weight of polyethylene terephthalate, 1–20% by weight of diethylene glycol, 1–15% by weight of neopentyl glycol, 1–10 by weight of pentaerythritol, 5–15% by weight of at least one oxyalkylated glycerine having 5–30 oxyethylene units per hydroxyl, 15–50% by weight of phthalic anhydride, and 5–10% by weight of trimellitic acid or trimellitic anhydride.

A similar preferred water-soluble or water-dispersible polyester resin comprises a reaction product of 15–30% by weight of the ester of sulfoisophthalic acid and polyethylene glycol, 15–25% by weight of polyethylene terephthalate, 1–10% by weight of oxyethylated glycerine having 5–30 oxyethylene units per hydroxyl, 35–45 % by weight of oxyalkyl units per hydroxyl, 35–45% by weight of phthalic anhydride.

Addition of 0.05–1% by weight of hypophosphoric acid is desirable to improve a color of the product.

As trimellitic acid is used as the end acid and the polyester is dissolved into water, a basic water solution is used. The basic chemicals, such as alkali metal or ammonium hydroxide or carbonates, are preferred. The amount of base used depends on the content of the resin in water solution. The solid content can be 20–70%. The resin solution can be very acidic and pH can be adjusted by alkali metal or ammonium hydroxide or carbonate.

Without further elaboration it is believed that one skilled in the art can, using the preceding description, can utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all percentages are by weight.

The following ingredients and abbreviations are used in the examples below:

Diethylene Glycol (DE), Neopentyl Glycol=2,2-dimethyl-1,3-propanoldiol (NPG), Manganese Acetate=Mn$(CH_3CO_2)_2$, Sodium Acetate=$CH_3COONa$, Polyethylene Therephthalate (PET), Pentaerythriol (PE), Dimethyl 5-sodio Sulfoisophthalic Acid (DMSIP) or Glycolates (SIPEG), Ethoxylated Glycerine (17–19 moles of ethylene oxide, molecular weight 850, Witco Chemical Co., Witconol 4073)=Ethox 2988, Phthalic Anhydride (PA), Trimelletic Anhydride (TMP), Hypophosporic Acid (HA), Tetrapropyl Titanate (TPT), Dibutyl Stannoic Acid (Foscat 2001).

EXAMPLE 1

The following ingredients are used:

| Ingredient | % weight | g |
| --- | --- | --- |
| DMSIP | 5.01 | 150.3 |
| DEG | 19.09 | 572.7 |
| NPG | 5.05 | 151.5 |
| Mn(CH$_3$CO$_2$)$_2$ | 0.2 | 6 |
| PET | 30.53 | 915.9 |
| Ethox 2988 | 11.04 | 331.2 |
| PE | 2.16 | 64.8 |
| PA | 20.64 | 619.2 |
| TMA | 6.23 | 186.9 |
| TPT | 0.05 | 1.5 |
| Total | 100% | 3,000.00 |

DMSIP, DEG (95.5% of total amount), NPG and Mn(CH$_3$CO$_2$)$_2$ are charged into 500 mL reaction vessel and heated to 180° C. to remove water. The reactor is equipped with thermometer, blade stirrer, condenser, and nitrogen inlet tube. When temperature has reached 190° C. PET and TPT are added to the hot mixture. The mixture has been heated to 240° C. for about 5 hours and cooled down to room temperature. Then the next day the mixture is heated Ethox, PE and PA are added to the reaction mixture heated to 200° C. The resulting mixture is heated to 215° C., 1% of the total amount of DEG (30 g.) is charged and kept for about 1.5 hours until A.V. (acid value) is 42.4 Another portion of DEG (1.5% of the total amount) is charged and the mixture is cooled down to room temperature. The next day the mixture is heated to 215° C. again and 2% of the initial DEG is charged. The mixture is kept for about 50 min. at 215° C., then cooled down to 180° C. and TMA is charged into the reactor. In 30 minutes all of the trimelletic anhydride is reacted. The resulting resinous mixture has the acid value of 59.84 and viscosity at 125° C. was 38 ps. About 32.50 g. of CH$_3$OH was removed.

EXAMPLE 2

The following ingredients are used:

| Ingredient | % weight | g |
| --- | --- | --- |
| DMSIP | 5.01 | 250.50 |
| DEG | 19.09 | 954.50 |
| NPG | 5.05 | 252.50 |
| Mn(CH$_3$CO$_2$)$_2$ | 0.20 | 10.00 |
| PET | 30.53 | 1526.50 |
| Ethox 2988 | 11.04 | 552.00 |
| PE | 2.16 | 108.00 |
| PA | 20.64 | 1032.00 |
| TMA | 6.23 | 311.50 |
| TPT | 0.05 | 2.50 |
| Total | 100% | 5,000.00 |

The procedure of Example 1 is followed but only one additional portion of 2% by weight of DEG was added when the reaction mixture had acid value 35.2 at 215° C. About 54.16 g of CH$_3$OH was removed.

EXAMPLE 3

The following ingredients are used:

| Ingredient | % weight | g |
| --- | --- | --- |
| DEG | 8.64 | 43.20 |
| NPG | 24.50 | 122.50 |
| CH$_3$COONa | 0.25 | 1.25 |
| Mn(CH$_3$CO$_2$)$_2$ | 0.20 | 1.00 |
| DMSIP | 8.00 | 40.00 |
| Ethox 2988 | 9.99 | 99.95 |
| PE | 5.00 | 25.00 |
| PA | 30.00 | 150.00 |
| Fascat 2001 | 0.10 | 0.50 |
| PET | 13.30 | 66.50 |
| TPT | 0.02 | 0.10 |
| Total | 100% | 500.00 g. |

A mixture of DEG, NPG, CH$_3$COONa, DMSIP and Mn(CH$_3$CO$_2$)$_2$ is charged into a reactor and heated to 180° C. The mixture is heated for about 3.5 hours and then the temperature has been raised to 190° C. Then PE, PA, Ethox 2988 and Fascat 2001 are charged into the reactor. The resulting mixture is heated for about 7 hours and at temperature 210° C. PET and TPT are charged. The mixture is cooled to 190° C. and gradually heated for about 2 hours to 236° C. Then the mixture is cooled down and started to break down. The after 9.5 hours the mixture is heated again to 235° C. The product obtained is cloudy with few particles. The temperature is increased up to about 245° C. The resulting resinous mixture is clear and dissolved to a level of 27% solid. The obtained solution is translucent.

EXAMPLE 4

The following ingredients are used:

| Ingredient | % weight | g |
| --- | --- | --- |
| DEG | 8.64 | 38.88 |
| NPG | 24.50 | 110.25 |
| CH$_3$COONa | 0.25 | 1.12 |
| Mn(CH$_3$CO$_2$)$_2$ | 0.20 | 0.90 |
| DMSIP | 8.00 | 36.00 |

-continued

| Ingredient | % weight | g |
|---|---|---|
| Ethox 2988 | 9.99 | 49.25 |
| PE | 5.00 | 22.50 |
| PA | 21.65 | 97.43 |
| Fascat 2001 | 0.10 | 0.45 |
| PET | 21.65 | 97.43 |
| TPT | 0.02 | 0.09 |
| Total | 100% | 459.00 g. |

The same procedure is used as in Example. A mixture of DEG, NPG, $CH_3COONa$, NPG, $Mn(CH_3CO_2)_2$ and DMSIP is charged into a reactor and heated to 180° C. Then ?? Ethox 2988, PE, PA, Fascat 2001 and PET are charged into the reactor. The resulting mixture is heated up to 220° C. Then the mixture is cooled down. The resulting solution is light and all PET appears to be broken down. The product is clear. The next day the product is heated up to 240° C. and distillate is taken under 26" Hg vacuum. The procedures ends when the product has viscosity about 40 ps.

EXAMPLE 5

The following ingredients are used:

| Ingredient | % weight | g |
|---|---|---|
| DEG | 8.64 | 86.40 |
| NPG | 24.35 | 243.05 |
| $CH_3COONa$ | 0.50 | 5.00 |
| $Mn(CH_3CO_2)_2$ | 0.20 | 2.00 |
| Ethox 2988 | 9.99 | 99.90 |
| PE | 5.00 | 50.00 |
| PA | 21.60 | 216.00 |
| Fascat 2001 | 0.10 | 1.00 |
| PET | 21.60 | 216.00 |
| TPT | 0.02 | 0.20 |
| Total | 100% | 500.00g. |

The alcohols, DEG, NPG, $CH_3COONa$, $Mn(CH_3CO_2)_2$ and DMSIP are charged together in is a reaction vessel and heated up to 190° C. Then Ethox 2988, PE, PA, Fascat 2001 and PET are charged and heated to 210° C. and kept for 2.5 hours and after that the mixture is cooled down. Next day resulting product is heated to 220° C. and 128 ml. distillate AU=7.85 and 30 ml. distillate AU=3.85 are taken. Then TPT is added at 240° C. The obtained mixture is cooled down to room temperature. The product appears to show color. Next day the resulting mixture is heated again to 240° C. under vacuum 27 Hg. Then vacuum is reduced to 7.00 ps. Color is dark. To avoid coloration TPT can be introduced to a mixture containing hypophosphoric acid. The colored product is heated to 140° C. and hypophosphoric acid is added at 150° C. Then TPT is added to the resulting mixture at 210° C. The mixture is heated up to 240° C. under vacuum at 27 Hg.

EXAMPLE 6

The following ingredients are used:

| Ingredient | % weight | g |
|---|---|---|
| SIPEG (A) | 30 | 135 |
| Ethox 2988 | 5 | 22.5 |
| Na-Acetate | 0.5 | 2.25 |
| Fascat 2001 | 0.1 | 0.45 |
| PET | 23.11 | 104 |

-continued

| Ingredient | % weight | g |
|---|---|---|
| PA | 41.29 | 185.8 |
| Total | 100% | 450.00 g. |

All ingredients except PA are charged into a reactor and heated to 205° C. The resulting mixture is heated to 220° C., then cooled to 190° C. and tested on clear peel test. PA is charged into the reactor and the mixture continued to cool down. Next day the mixture is heated up to 200° C. for about 8 hours. When AV reaches 14.3 the mixture is dilated to 30% to good particle size.

EXAMPLE 7

The following ingredients are used:

| Ingredient | weight % | g |
|---|---|---|
| SIPEG (C) | 30 | 300 |
| Ethox 2988 | 5 | 50 |
| Na-Acetate | 0.5 | 5 |
| TPT | 0.05 | 0.5 |
| PET | 23.11 | 231.1 |
| PA | 41.09 | 410.9 |
| Hypophosporic Acid | 0.25 | 2.5 |
| Total | 100% | 1,000.00 g. |

All ingredients except PA and Hypophosphoric Acid are charged into a reactor and heated to 210° C. until all PET is dissolved. Then the resulting product is cooled to 190° C. and PA and Hypophosphoric Acid are added. As soon as Hypophosphoric Acid is added the solution is turned midnight black. The resulting mixture is cooled down to room temperature. Next day the resulting mixture is heated to 313° C. At this temperature the solution has 15.69 AV and 8.3 viscosity equal 8.3.

The preceding examples can be repeated with similar success by substituting the generically or specifically described reactants and/or operating conditions of this invention for those used in the preceding examples.

EXAMPLE 8

Wound pakages ("muffs") made of texturized polyester yarns were streamed through on a high-temperature dyeing machine and at agoods-to-liquor ratio of 1:10, by aliquor at 130° C. which consisted of soft water(pH4.5 adjusted with acetic acid)and 0.5 g of water-dispersible polyester prepared according to Example 1.

To this liquor was added quickly by means of an introduction equipment a mixture predispersed with water of 40° C. and consisiting of disperse dyes such as those shown in U.S. Pat. No. 4,101,274 whose entire contents are incorporated by reference therein.

A perfectly level dyeing was obtained in full dyestuff yield.

From the foregoing description, one skilled in the art can easily ascertain the essential characteristics of this invention and, without departing from the spirit and scope thereof, can make various changes and modifications of the invention to adapt it to various usages and conditions. The invention is defined by the following subjoined claims.

I claim:

1. A water-soluble or water-dispersible recycled polyester resin, comprising a reaction product of 1–50% by weight of a sulfoaryl dicarboxylic acid, 10–50% by weight of a terephthalate polymer comprising polyalkylene terephthalate units, 1–50% by weight at least one glycol and optionally 1–50% by weight of at least one oxyalkylated polyol.

2. The resin of claim 1, wherein sulfoaryl dicarboxylic acid is in an ester form.

3. The resin of claim 1, comprising a reaction product also containing 15–50% by weight of polyacid.

4. The resin of claim 3, wherein the polyacid is phthalic anhydride.

5. A water-soluble or water dispersible polyester resin of claim 2, comprising a reaction product of 1–50% by weight of sulfoaryl dicarboxylate, 10–50% by weight of terephthalate polymer comprising polyalkylene terephthalate units, 1–50% by weight at least one glycol and optionally 1–50% by weight of at least one oxyalkylated polyol.

6. The resin of claim 5 wherein the sulfoaryl dicarboxylate is dimethylsulfoisophthalate.

7. A water-soluble or water-dispersible polyester resin of claim 3, comprising a product of further reaction with 3–15% by weight of trimellitic acid or trimellitic anhydride.

8. A water-soluble or water-dispersible resin of claim 2, comprising a reaction product of 15–50% by weight of ester of sulfoaryl dicarboxylic acid and polyalkylene glycol, 10–50% by weight of waste terephthalate polymer comprising polyalkylene terephthalate units, 10–50% by weight at least one glycol, 15–50% by weight of at least one oxyalkylated polyol, and 15–50% by weight of a polyacid.

9. A water-soluble or water-dispersible resin of claim 8 wherein ester of sulfoaryl dicarboxylic acid and polyalkylene glycol is the ester of sulfoisophthalic acid and polyethylene glycol.

10. The water-soluble or water-dispersible polyester resin of claim 2, comprising a reaction product of 1–10% by weight of dimethylsulfoisophthalate, 10–50% by weight of polyethylene terephthalate, 1–25% by weight of diethylene glycol, 1–15% by weight of neopentyl glycol, 1–10% by weight of pentaerythritol, 5–15% by weight of at least one oxyalkylated glycerine having 5–30 oxyethylene units per hydroxyl, 15–50% by weight of phthalic anhydride, and 5–10% by weight of trimellitic acid or trimellitic anhydride.

11. The water-soluble or water-dispersible polyester resin of claim 2 comprising a reaction product of 15–35% by weight of the ester of sulfoisophthalic acid and polyethylene glycol, 15–25% by weight of polyethylene terephthalate, 1–10% by weight of oxyethylated glycerine having 5–30 oxyethylene units per hydroxyl, 35–50% by weight of oxyalkyl units per hydroxyl, 35–45% by weight of phthalic anhydride.

12. The water-soluble or water-dispersible polyester of claim 8 further comprising 0.05–1% by weight of hypophosphoric acid.

13. The water-soluble or water-dispersible polyester resin of claim 1, wherein the oxyalkylated polyol is selected from the group consisting of pentaerythritol, erythritol, monosaccharose, sorbitol, mannitol, trimethylolpropane or mixtures thereof.

14. The water-soluble or water-dispersible polyester resin of claim 1 wherein the terephthalate polymer is a waste terephthalate polymer.

15. The water-soluble or water-dispersible and curable polyester resin of claim 1 wherein the terephthalate polymer is polyethylene terephthalate, polybutylene terephthalate, polycyclohexanedimethanol terephthalate, or a mixture thereof.

16. The water-soluble or water-dispersible polyester resin of claim 1 wherein the glycol is selected from the group consisting of polyethylene glycol and neopentyl or a mixture thereof.

17. The method for making water-soluble or water-dispersible polyester resin of claim 1 comprising adding a catalyst taken from the group consisting of acetate, alkyl stannoic acid, alkyl tin oxide, alkyl titanate or a mixture thereof to the reaction mixture.

18. The method for making water-soluble or water-dispersible polyester resin of claim 17 wherein the catalyst taken from the group consisting of manganese acetate, sodium acetate, dibutyl stannoic acid or a mixture thereof.

19. The method for making water-soluble or water-dispersible polyester resin of claim 17 comprising dispersing or dissolving the resin in water with an alkali metal or ammonium hydroxide or carbonate.

20. The water soluble or water-dispersible polyester resins of claim 1, comprising the reaction product of waste terephthalate polymer of the unit formula

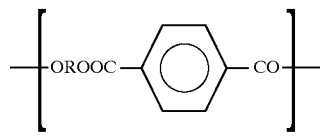

wherein R is the residue of an aliphatic or cycloaliphatic glycol of 2–10 carbons or of an oxygenated glycol of the formula

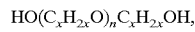

wherein x is an integer from 2–4 and n is 1–10.

21. The water-soluble or water-dispersible polyester resin of claim 1, wherein the oxyalkylated polyol is glycerol, trimethylolpropane, pentaerythritol, erythritol or a monosaccharide, oxyalkylated with 5–30 moles of ethylene oxide or a mixture thereof, per hydroxyl of the polyol.

22. The water-soluble or water-dispersible polyester resin of claim 3, dissolved or dispersed in water with an alkali metal or ammonium hydroxide or carbonate.

23. The water-soluble or water-dispersible polyester resin of claim 19, diluted with water to a resin solids content of 0.5–5%.

24. Fiber, fabric or paper coated with the water-soluble or water-dispersible resin of claim 1.

25. Fiber, fabric or paper coated with the water-soluble or water-dispersible resin of claim 2.

26. A dyed fiber or fabric incorporating as a dye leveler the water-soluble or water dispersible resin of claim 1.

27. A dyed fiber or fabric incorporating as a dye leveler the water-soluble or water dispersible resin of claim 2.

28. A process for the level dyeing of synthetic fibers derived from polyesters and polyamides, with water insoluble disperse dyestuffs, which comprises adding to the aqueous dystuff and pH regulating substances, as levelling agents an effective amount of the resin of claim 1 to impart level dyeing to said fibers.

29. A water-soluble or water-dispersible polyester resin comprising a reaction product of 15–50% of an ester of sulfoaryl dicarboxylic acid and polyalkylene glycol, 10–50% by weight of waste terephthalate polymer, 10–50% by weight of at least one glycol, 15–50% by weight of at least one oxyalkylated polyol, and 15–50% by weight of polyacid.

30. A water-soluble or water-dispersible polyester resin comprising the reaction product of 1–10% by weight of dimethylsulfoisophthalate, 10–50% by weight of polyethylene terephthalate, 1–25% by weight of diethylene glycol, 1–15% by weight of neopentyl glycol, 1–10% by weight of pentaerythritol, 5–15% by weight of at least one oxyalkylated glycerine having 5–30 oxyethylene units per hydroxyl, 15–50% by weight of phthalic anhydride, and 5–10% by weight of trimellitic acid or trimellitic anhydride.

31. A water-soluble or water-dispersible polyester resin comprising the reaction product of 15–35% by weight of the ester of sulfoisophthalic acid and polyethylene glycol, 15–25% by weight of polyethylene terephthalate, 1–10% by weight of oxyethylated glycerine having 5–30 oxyethylene units per hydroxyl, 35–50% by weight of oxyalkyl units per hydroxyl, 35–45% by weight of phthalic anhydride.

* * * * *